Jan. 11, 1966 W. H. COURNOYER ETAL 3,228,065
DEVICE FOR FEEDING RAW MATERIALS TO PLASTIC EXTRUSION MACHINES
Filed Nov. 26, 1963
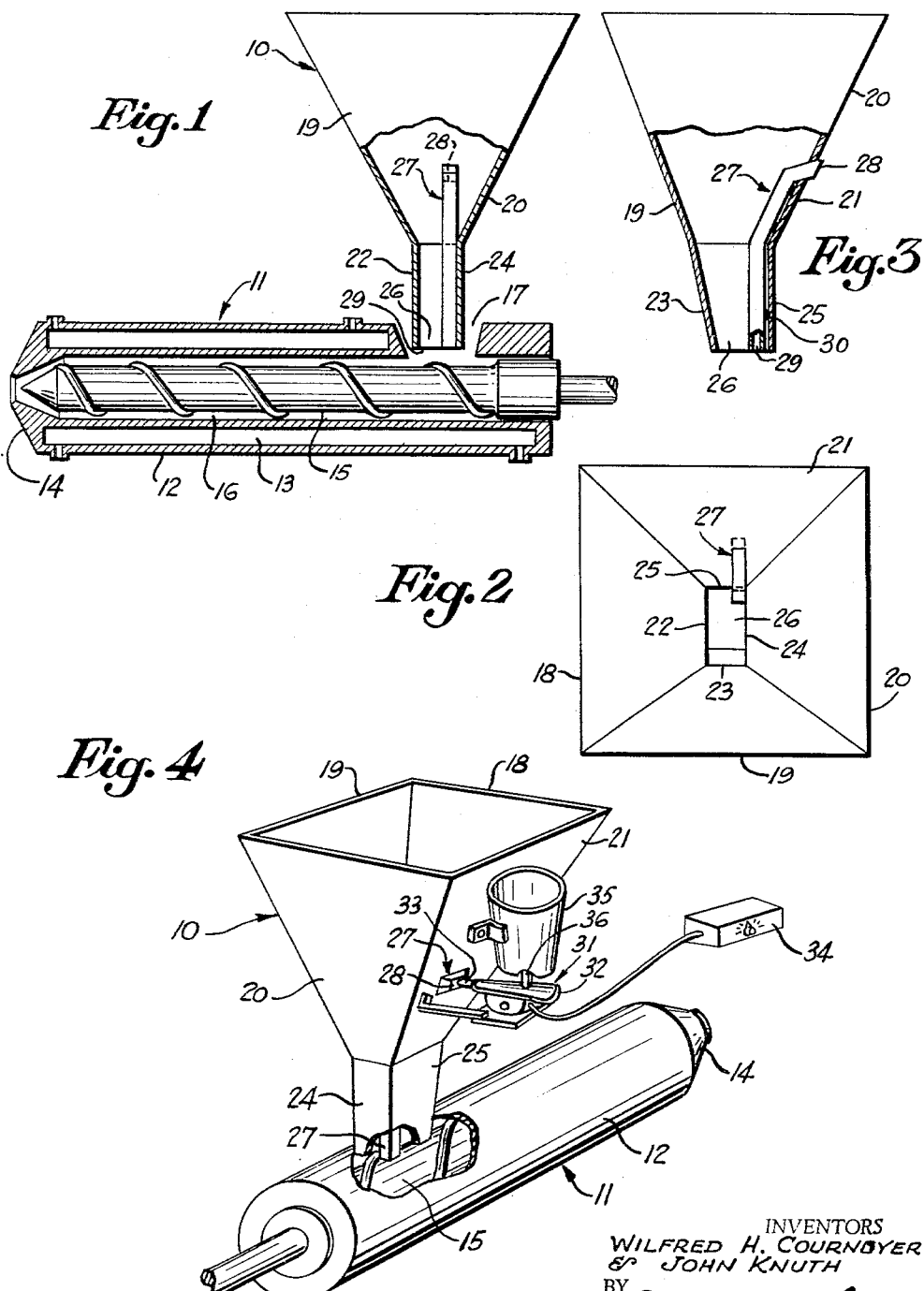
INVENTORS
WILFRED H. COURNOYER
& JOHN KNUTH
BY
Richards & Geier
ATTORNEYS United States Patent Office 3,228,065
Patented Jan. 11, 1966

3,228,065
DEVICE FOR FEEDING RAW MATERIALS TO PLASTIC EXTRUSION MACHINES
Wilfred H. Cournoyer, 305 Brookside Ave., Cresskill, N.J., and John Knuth, 1288 1st Ave., New York, N.Y.
Filed Nov. 26, 1963, Ser. No. 326,066
2 Claims. (Cl. 18—12)

This invention relates to the mixing of dyes with plastic moulding compounds and refers more particularly to a mixing hopper for simultaneously feeding raw plastic moulding compound and color dyes into a plastic extrusion machine.

The production of extruded plastics products generally requires that the raw material or moulding compound be mixed with color dyes prior to being fed into the extrusion machine. This usually involves mixing the raw plastic material with the color dye in a blender or hopper device separate from the extrusion machine. At best, this mixing operation is not altogether satisfactory for the reason that the raw plastic material which is usually in pellet form, and the color dyes which are usually a very fine powder, do not thoroughly mix together. The dye powder does not cling too well to the smooth surface of the plastic pellets, and considerable settlement of the color dye in the mixture occurs prior to placing it in the feed hopper of the extrusion machine. This often leads to lack of color uniformity in the extruded products.

It is, therefore, the primary object of the present invention to provide a device for uniformly mixing together the raw plastic moulding compound and color dyes used in plastic extrusion machines.

Another object is to provide a mixing hopper for use on plastic extrusion machines.

A further object is to provide a mixing hopper for use on plastic extrusion machines which eliminates the need for premixing the raw moulding material and color dyes fed into plastic extrusion machines.

Other objects of the present invention will become apparent during the course of the following specification.

In achieving the aforementioned objectives of the present invention, the mixing hopper comprises a hopper body having a large upper body portion and a smaller lower portion which funnels moulding compound contained in the hopper into the auger of a plastic extrusion machine. The hopper contains a small feeding conduit through which small quantities of color dyes may be fed directly into the auger. In this manner, the extrusion machine receives exactly proportional quantities of raw moulding compound and color dye so that the desired coloring and uniformity in the color of the extruded plastic products is obtained.

The invention will appear more clearly from the following detailed description when taken in conjunction with the accompanying drawings showing by way of example, a preferred embodiment of the inventive concept.

In the drawings:

FIGURE 1 is a side elevational view partly in section of a mixing hopper constructed in accordance with the principles of the present invention.

FIGURE 2 is a top plan view of the mixing hopper shown in FIGURE 1.

FIGURE 3 is a rear elevational view partly in section of the mixing hopper.

FIGURE 4 is a perspective view, on enlarged scale, of the mixing hopper of the present invention and shows the hopper in position for feeding the extrusion machine.

Throughout the specification like reference numerals are used to indicate like parts.

Referring to FIGURE 1 of the drawings, the mixing hopper 10 of the present invention is intended for use in feeding plastic moulding compounds into a plastic extruding machine 11. The extruding machine 11 is of a type well known in the art and includes a barrel 12 having passages 13 for receiving a heating fluid, an extrusion head 14, and an auger 15 which advances the moulding compound through the melting chamber 16 of the barrel to the extrusion head, the moulding compound being delivered to the auger through an opening 17 in the top of the barrel.

The mixing hopper 10 has an upper body comprising the four sides 18–21 of an inverted, truncated pyramid and a substantially rectangular-shaped lower body comprising sides 22–25 which are preferably extensions of the upper body sides 18–21 respectively. The mixing hopper 10 is adapted to hold a quantity of raw plastic moulding compound, such as a vinyl, which is generally in the form of small pellets. The plastic pellets flow through the opening 26 at the bottom of the hopper by force of gravity into the barrel 12 of the extrusion machine at a rate determined by the speed of rotation of the auger 15. Plastic extrusion machines are generally rated by the amount of moulding compound the auger delivers to the extrusion head per unit of time, as for example, 160 pounds per hour.

The hopper 10 is provided with an internal feeding conduit 27 which is used for feeding predetermined quantities of color dyes directly into the barrel of the extrusion machine. The feeding conduit 27 is an elongated, rectangular cross-sectioned hollow member and has an inlet 28 at the top and an outlet 29 at the bottom, the inlet 28 being located in hopper upper body side 21 as shown. The feeding conduit is supported on the inner surfaces of hopper 10 by means of spot welds 30 and generally conforms in shape to the contour of the hopper.

A more complete understanding of the mixing hopper 10 will be apparent from the following description of the use of the mixing hopper. Referring to FIG. 4, the mixing hopper 10 is supported above the extrusion machine 11 with the lower body portion of the hopper directly above the auger 15 so that raw plastic moulding compound may be fed directly into the revolving auger. The hopper may be so supported by a frame (not shown), straps or other suitable supporting members. Shown supported on the side of the mixing hopper is a vibrator 31 which comprises a vibrating trough 32 having a snout 33 leading to the feeding conduit 27 and a control 34 for controlling the speed of the vibrating trough. Supported above the vibrating trough 32 is a container 35 for holding color dye generally in the form of powder; the container 35 may be provided with a chute 36 for directing the flow of color dye from the container and onto the vibrating trough. When it is desired to add coloring to the raw plastic moulding compound, it is done by using weight ratios. Thus, for example, one pound of color dye may be added to each 99 pounds of raw plastic moulding compound. Assuming that the hopper 10 is filled with raw plastic moulding compound, the extrusion machine may be set to deliver 100 pounds of extruded product per hour. This is effected by setting the auger speed to deliver at that rate. The color dye in container 35 may be fed therefrom onto vibrating trough 32 by gravity or by using another vibrator mechanism (not shown) attached to the container. The vibrating trough in turn is set to vibrate at a rate which will deliver one pound of color dye per hour to the feeding conduit 27 by way of snout 33. The color dye will fall through the feeding conduit into the rotating auger 15 which picks up the color dye and raw plastic moulding compound and thoroughly mixes them together almost immediately. The extrusion operation is then carried out in the customary manner.

It is apparent that the mixing hopper 10 of the present invention feeds the raw plastic moulding compound and color dye directly into the extrusion machine in the exact proportions required to insure uniform coloration of the extruded products. This is an important feature of the feeding hopper in that it provides direct and exact feeding of the color dye and raw compound. The use of the mixing hopper also eliminates the need to premix the color dye and raw plastic moulding compound, thereby eliminating at least one step in the extrusion process along with elimination of the prior art problem of settlement of the dye when premixing is employed.

While there is above disclosed but one embodiment of the mixing hopper of the present invention, it is possible to produce still other embodiments without departing from the scope of the inventive concept herein disclosed.

What is claimed is:

1. In combination with a plastic extrusion machine having an auger and means connected with said auger for rotating it at a selected speed; a device for simultaneously feeding moulding compounds and dyes to said auger, said device comprising a hopper having side walls enclosing an upper opening for receiving the moulding compounds and a lower opening communicating with said auger, a conduit for feeding dyes to said auger, said conduit being located within said hopper and attached to and extending along an inner surface thereof, said conduit having an upper opening extending outwardly through a side of said hopper and a lower opening which is substantially in alinement with the lower opening of said hopper, a trough having a snout located adjacent the upper opening of said conduit for feeding dyes thereto, and means connected with said trough for vibrating said trough at a selected rate corresponding to the selected speed of said auger, whereby selected proportions of moulding compounds and dyes are fed by said auger.

2. A device in accordance with claim 1, further comprising a dye-feeding container located above said trough and having a chute directed toward said trough, said container being attached to an outer wall of said hopper.

References Cited by the Examiner
UNITED STATES PATENTS

| 1,140,385 | 5/1915 | MacLennan. | |
| 1,156,096 | 10/1915 | Price | 18—12 |
| 2,494,588 | 1/1950 | Skoaglund | 18—12 |
| 2,634,691 | 4/1953 | Flockhart | 18—12 X |
| 2,641,848 | 6/1953 | Wilson. | |

FOREIGN PATENTS 936,014  9/1963  Great Britain.

J. SPENCER OVERHOLSER, *Primary Examiner.*

MICHAEL V. BRINDISI, *Examiner.*